No. 621,848. Patented Mar. 28, 1899.
H. C. REAGAN, Jr.
ELECTRIC RAILWAY.
(Application filed Jan. 8, 1896.)
(No Model.) 3 Sheets—Sheet 1.
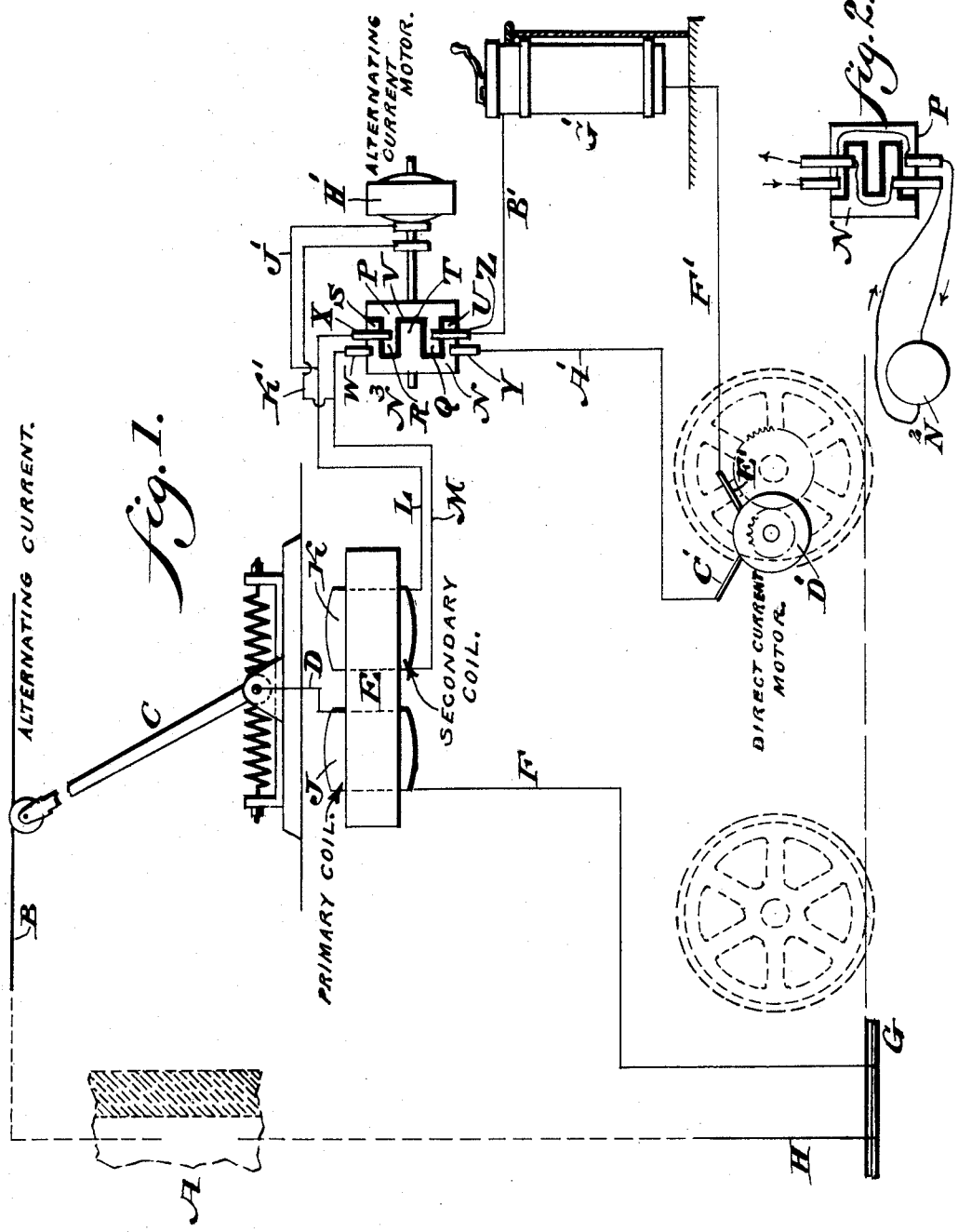
WITNESSES:
L. Douville,
E. H. Fairbanks.
INVENTOR
Harry C. Reagan Jr.
BY
John A. Niedersheim
ATTORNEY.

No. 621,848. Patented Mar. 28, 1899.
H. C. REAGAN, Jr.
ELECTRIC RAILWAY.
(Application filed Jan. 8, 1896.)
(No Model.) 3 Sheets—Sheet 2.
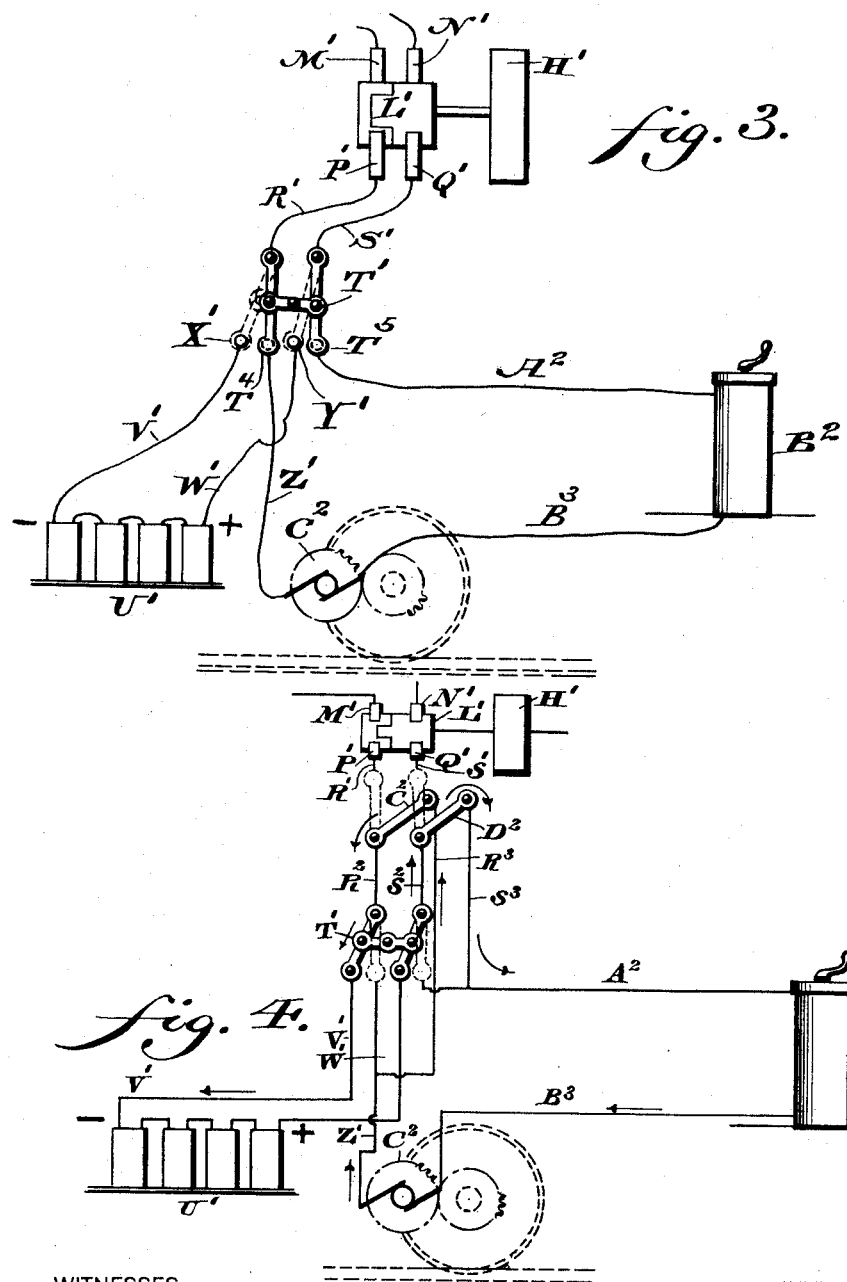

No. 621,848. Patented Mar. 28, 1899.
H. C. REAGAN, Jr.
ELECTRIC RAILWAY.
(Application filed Jan. 8, 1896.)
(No Model.) 3 Sheets—Sheet 3.
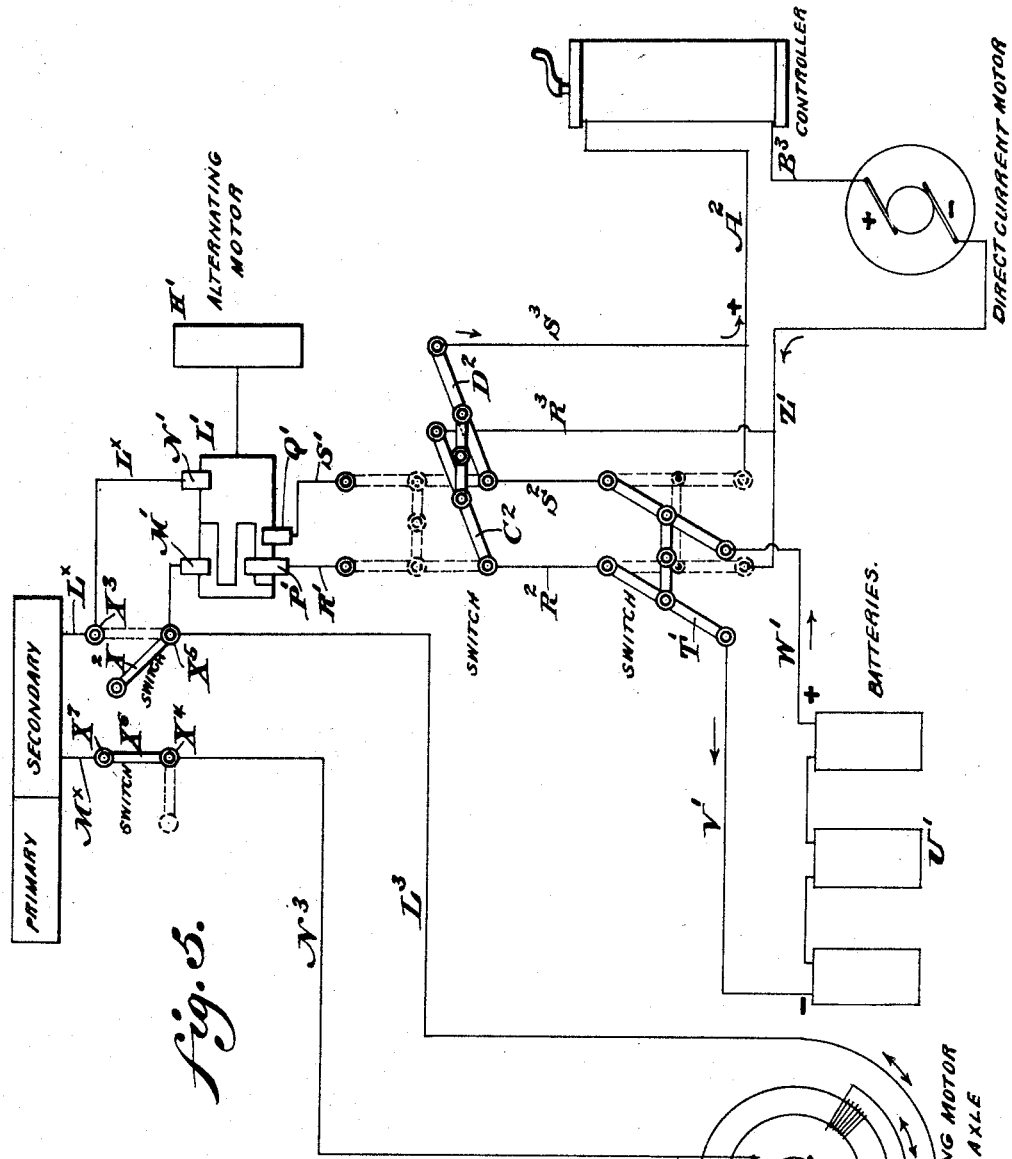

UNITED STATES PATENT OFFICE.

HARRY C. REAGAN, JR., OF PHILADELPHIA, PENNSYLVANIA.

ELECTRIC RAILWAY.

SPECIFICATION forming part of Letters Patent No. 621,848, dated March 28, 1899.

Application filed January 8, 1896. Serial No. 574,700. (No model.)

*To all whom it may concern:*

Be it known that I, HARRY C. REAGAN, Jr., a citizen of the United States, residing in the city and county of Philadelphia, State of Pennsylvania, have invented a new and useful Improvement in Electric Railways, which improvement is fully set forth in the following specification and accompanying drawings.

My invention relates to electric railways; and it consists of novel means for producing a system of electric propulsion for street-cars, &c., which can be operated by an alternating current, means being provided for transforming the alternating current into a direct current by the interposition of a suitable rectifier and its adjuncts, thereby enabling a direct-current motor to be used.

It further consists of a novel manner of assembling and connecting up a rectifier, storage battery, motors, &c., whereby said storage battery can be directly charged from the rectifier.

It further consists of a novel method of arranging the above parts with the connections, switches, &c., whereby the storage battery can be employed to run the motor.

It further consists of a novel construction of switches, rectifier, storage battery, and their adjuncts in combination with an alternating motor mounted on the car-axle.

It further consists of a novel method of utilizing the above system of propulsion, which consists in using storage batteries to start a car and get it up to the desired speed, then cutting said battery out, and using a direct current from the line.

It further consists of novel details of construction, all as will be hereinafter set forth.

Figure 1 represents a diagrammatic view and side elevation of a system of electric propulsion embodying my invention, the storage battery being omitted. Fig. 2 represents a detail view of a rectifier employed and its adjuncts, to be hereinafter referred to. Fig. 3 represents a system of electric propulsion in which storage batteries are employed, said batteries being capable of being charged from the rectifier. Fig. 4 represents a diagrammatic view of the same system of propulsion, showing the storage battery, its connections, adjuncts, &c., and a motor and switches whereby said battery can be employed to run said motor. Fig. 5 represents a diagrammatic view similar to Fig. 4, showing an alternating motor mounted on the car-axle.

Similar letters of reference indicate corresponding parts in the several figures.

In the drawings, referring first to Fig. 1, A designates a power-house, from which connection is made to the feed-wire B, which carries the alternating current, which is conducted from said wire by means of the trolley-pole C and its adjuncts, which are of usual construction, to the conductor D and thence to the primary coil J of the transformer E. F designates a conductor leading from said primary coil to the rail G and thence to the conductor H, which leads to the power-house A when a ground return is used; but I prefer to use a metallic return in most instances.

K designates a secondary coil which has leading therefrom the conductors L and M to the rectifier $N^3$, which is placed at any convenient point, the function of said rectifier being to change the alternating current to a direct current. The said rectifier is constructed of two metal crown-wheels N and P, the latter having the fingers or teeth Q and R, &c., which project into the recesses between the fingers S, T, and U of the wheel N, said wheels N and P being insulated from each other by means of suitable insulation V. (Shown in heavy black lines in Fig. 1.)

W and X designate brushes which are in connection with the secondary coil through the medium of the conductors L and M, said brushes bearing against the aforesaid teeth S and R, one against a separate tooth, there being also two brushes Y and Z, which bear against the teeth of the rectifier on the opposite side, said latter brushes receiving the alternating current thus rectified into a direct current. A' B' designate conductors leading from said brushes Y and Z, as shown, the conductor A' leading to the brush C' of the direct-current motor D', which has a brush E', from which latter leads the conductor F' to the controller G', the latter being in communication with the brush Z through the medium of the conductor B'.

H' designates a small alternating motor which is suitably mounted and is adapted to cause the rectifier $N^3$ to revolve, said motor to run in synchronism or step with the transformer or generator and to be run continuously even when the car is stopped, the object of this being to prevent sparking at the rectifier-brushes and to enable the segments to be rotating at the proper speed and time for the brushes to pass from one segment to the other or at the zero-point.

J' K' designate conductors leading from the conductors L and M, respectively, to the brushes of said motor H', it being apparent that the latter can be connected as a shunt to the secondary or primary coil.

As is well understood, the transformer in parallel is self-regulating, and the controller can be operated as with the usual direct current, and the alternating motor H' being in shunt will receive a portion of the current even while the controller is off, so that said alternating motor will continue to run and keep in step.

The operation of the construction seen in Fig. 2 will, it is thought, be apparent without further description, N and P designating the wheels constituting the rectifier, as before, $N^2$ the motor, and the connections between the latter and the rectifier being evident.

In the construction seen in Fig. 3 I show a modification of my invention, in which, if desired, I can carry storage batteries on the car as a reserve power, and when a car-motor is stopped I may shift the switch employed and charge the batteries by a direct current from the rectifier, and, if desired, can connect the batteries to a series parallel controller, and so run the car with the batteries, as seen in Fig. 4.

In the above construction L' designates a rectifier, and M' and N' designate the brushes conducting the current thereinto. P' and Q' designate brushes by which the current leaves said rectifier and passes to the conductors R' and S'.

T' designates a double switch employed, from which the conductors Z' or $A^2$ lead to the motor $C^2$ and the controller $B^2$, respectively, the latter being in communication with the motor through the medium of the conductor $B^3$.

X' Y' designate contact-points which have the conductors V' W', respectively, leading therefrom to the battery U'.

It will be evident that when the parts are in the position seen in Fig. 3 in full lines the storage battery is out of circuit and that the current is passing directly from the rectifier to the controller and thence to the car-motor $C^2$. If, however, the switch T' be turned into position seen in dotted lines, the storage battery will then be in the position of being charged by the rectifier, the points $T^4$ and $T^5$ of the switch being then moved out of connection with the conductors Z' and $A^2$ and being then on the points X' and Y'.

In Fig. 4 I have shown the batteries, rectifier, controller, motor, and the connections therebetween substantially the same as in Fig. 3, except that a suitable switch having members $C^2 D^2$ has been interposed in the connections R' S', said switch having the conductors $R^2 S^2$ leading therefrom to the switch T', which may be substantially the same as seen in Fig. 3.

$R^3$ and $S^3$ designate connections leading from the members $C^2 D^2$ of the switch, respectively, to the conductors Z' $A^2$, whereupon it will be seen that when the parts are in the position seen in Fig. 4 the course of the current will be as indicated by the arrows, the same leaving the battery through the conductor W' and passing through the switch T', conductor $S^2$, switch member $D^2$, and the conductors $S^3$ and $A^2$ to the controller, and thence to the motor $C^2$, back again through the medium of the connections Z' $R^3$, switch member $C^2$, the conductor $R^2$, switch T', and conductor V' back into the battery U, it being remembered that the small alternating motor H', which actuates the rectifier, continues to run.

In Fig. 5 I have shown an alternating motor $Q^3$ mounted upon the axle $R^3$ of the car, said alternating motor being adapted to assist the direct-current motor in its work, the battery, rectifier, switches T', $C^2$, and $D^2$, and their connections to and from the rectifier L' being substantially the same as already described with reference to Fig. 4.

$L^3$ designates a conductor leading from the alternating motor $Q^3$ to the point $X^5$, from which latter connection is made to the brush M'.

$L^X$ designates a conductor leading from the brush N' to the point $X^3$ and thence to the secondary winding of the transformer.

$N^3$ designates a conductor leading from the alternating motor to the point $X^4$ and thence through the switch $X^6$ to the point $X^7$ and from the latter, by the conductor $M^X$, to the secondary winding of the transformer.

$X^6$ designates a switch adapted to make and break the electrical connection between the points $X^4$ and $X^7$, while the switch $X^2$ is adapted to make and break the circuit from the point $X^5$ to the points $X^4$ and $X^3$.

When the parts are in the position seen in full lines in Fig. 5, the motors are operating in series, or, in other words, the current passes through both motors, the secondary winding of the transformer, the rectifier, and the controller. To operate in parallel, the switch $X^2$ is turned to the point $X^3$, whereupon part of the current passes to the alternating motor, the rectifier, the controller, and the direct-current motor. If the switch $X^2$ is turned to the point $X^4$, then the alternating-current motor will be short-circuited, as is evident.

The object of the employment of an alternating motor is that when the car or locomotive is brought up to the desired speed I can then throw the alternating motor in, and as the consumption of current is regulated by the amount used by the direct-current motor from the controller then by connecting the alternating motor in series or multiple with one side of the secondary circuit the controller will also regulate the alternating motor, since the amount of current in the secondary circuit is in ratio with the consumption, the alternating motor having of course its usual function in which the current divides, part going through the fields and part the armature and both emerging into one wire of the negative brush, as is evident.

Having thus described my invention, what I claim as new, and desire to secure by Letters Patent, is—

1. In a system of electric propulsion, the combination of an electric generator for producing an alternating current, a conductor connected with said generator, a car or locomotive, mechanism forming a circuit for conveying the current from said conductor through said car or locomotive, a transformer carried by said car having its primary coil interposed in the circuit formed by said mechanism, a rectifier, conductors connecting the secondary coil of said transformer with said rectifier, an alternating-current motor for continuously driving said rectifier and connected with the conductors leading from the transformer to the rectifier, a direct-current motor, conductors connecting said rectifier and said direct-current motor, and a controller interposed in the conductors connecting the rectifier and the direct-current motor.

2. In a system of electric propulsion, the combination of an electric generator for producing an alternating current, a conductor connected with said generator, a car or locomotive, a trolley mechanism mounted on said car for conveying the current from said conductor to said car, a circuit leading from said trolley mechanism through said car, a transformer carried by said car having its primary coil interposed in said circuit, a rectifier, conductors connecting the secondary coil of the transformer with the said rectifier, an alternating-current motor for continuously driving said motor, a shunt-circuit connecting said motor with the conductors leading from the transformer to the rectifier, a direct-current motor, conductors connecting said rectifier with said direct-current motor, and a controller interposed in the last-mentioned conductors.

3. In a system of electric propulsion, the combination of an electric generator for producing an alternating current, a conductor connected with said generator, a car or locomotive, mechanism forming a circuit for conveying the current from said conductor through said car, a transformer carried by said car having its primary coil interposed in the circuit formed by said mechanism, a rectifier, conductors connecting the secondary coil of said transformer with said rectifier, an alternating-current motor for continuously driving said rectifier and connected with the conductors leading from the transformer to the rectifier, a battery, a direct-current motor, conductors leading from said rectifier to said battery and to said direct-current motor, a switch mechanism controlling said conductors leading from the rectifier to the battery and to the direct-current motor whereby either said battery or said motor can be electrically connected with said rectifier, and a controller interposed in the conductors leading to the direct-current motor.

4. In a system of electric propulsion, the combination of a rectifier, means for conveying an alternating current to said rectifier, a battery, a direct-current motor, a switch mechanism, conductors leading from said rectifier to said switch mechanism, conductors leading from said switch mechanism to said battery, conductors leading from said switch mechanism to said motor, the said switch mechanism operating to control the circuit through either the conductors leading to the battery or the circuit through the conductors leading to the motor, and a controller interposed in the conductors leading to the motor.

5. In a system of electric propulsion, the combination of a rectifier, means for conveying an alternating current to said rectifier, a switch mechanism, conductors leading from said rectifier to said switch mechanism, a second switch mechanism, conductors leading from said first switch mechanism to said second switch mechanism, a battery, conductors leading from said second switch mechanism to said battery, a direct-current motor, conductors leading from said second switch mechanism to said motor, the said first switch mechanism operating to control the conductors leading from the rectifier to the second switch mechanism, and said second switch mechanism operating to connect the conductors leading to it with either the conductors leading to the battery or with the conductors leading to the motor, and a controller interposed in the conductors leading to said motor.

6. In a system of electric propulsion, the combination of a rectifier, means for conveying an alternating current to said rectifier, a switch mechanism, conductors leading from said rectifier to said switch mechanism, a second switch mechanism, conductors leading from said first switch mechanism to said second switch mechanism, a battery, conductors leading from said second switch mechanism to said battery, a direct-current motor, conductors leading from said second switch mechanism to said motor, the said second switch mechanism operating to connect the conductors leading to it with either the conductors leading to the battery or with the conductors leading to the motor, conductors leading from terminals adjacent to the first switch mechanism to the conductors leading to the motor, the said first switch mechanism operating to connect the conductors leading from it with either the conductors leading from the rectifier or with the conductors having terminals adjacent the said first switch mechanism and leading to the conductors connected with the motor, whereby said battery alone can be employed to run the direct-current motor, or said battery can be charged directly from the rectifier, or the current can be taken directly from said rectifier to said motor.

7. In a system of electric propulsion, the combination of a transformer, a rectifier, a direct-current motor, an alternating-current motor operating to propel the car, conductors connecting the transformer with the alternating-current motor, conductors connecting the transformer with the rectifier, and conductors connecting the rectifier with the direct-current motor.

8. In a system of electric propulsion, the combination of a transformer, a rectifier, a direct-current motor, an alternating-current motor operating to propel the car, a battery, conductors leading from the transformer to the rectifier, conductors connecting the rectifier with the direct-current motor, conductors leading from the transformer to the alternating-current motor, conductors leading from the rectifier to the battery, and devices for controlling said conductors.

9. In a system of electric propulsion, the combination of a transformer, a rectifier, an alternating-current motor operating to propel the car, a battery, a direct-current motor, conductors leading from the transformer to the rectifier, conductors leading from the transformer to the alternating-current motor, a switch mechanism, conductors leading from the rectifier to said switch mechanism, a second switch mechanism, conductors leading from the first switch mechanism to the second switch mechanism, conductors leading from the second switch mechanism to the battery, conductors leading from the second switch mechanism to the direct-current motor with terminals adjacent to the first switch mechanism, the said second switch mechanism operating to connect the conductors leading to it with either the conductors leading to the battery or the conductors leading to the direct-current motor, and the first switch mechanism operating to connect the conductors leading to it from the rectifier with the conductors leading from it to the second switch mechanism or connecting the conductors forming the connections between it and the second switch mechanism with the conductors leading from terminals adjacent said first switch mechanism to the conductors connected with the direct-current motor.

10. The combination of a rectifier, a transformer a direct-current motor, an alternating motor and a battery, of conductors for said alternating motor, connections from the rectifier to the battery and to the controller and direct-current motor, and a plurality of switches in said connections, whereby said batteries alone can be employed to run the direct-current motor, or said battery may be charged directly from the rectifier, or the current can be taken from said rectifier to the direct-current motor.

11. In a system of electric propulsion, the combination of a rectifier, means for conveying an alternating current to said rectifier, a switch mechanism, conductors leading from said rectifier to said switch mechanism, a second switch mechanism, conductors leading from said first switch mechanism to said second switch mechanism, a battery, conductors leading from said second switch mechanism to said battery, a direct-current motor, conductors leading from said second switch mechanism to said motor, the said second switch mechanism operating to connect the conductors leading to it with either the conductors leading to the battery or with the conductors leading to the motor, conductors leading from terminals adjacent to the first switch mechanism to said motor, the said first switch mechanism operating to connect the conductors leading from it with either the conductors leading from the rectifier or with the conductors having terminals adjacent the first switch mechanism and leading to the motor, whereby said battery alone can be employed to run the direct-current motor, or said battery can be charged directly from the rectifier, or the current can be taken directly from said rectifier to said motor.

12. The combination, of a transformer, a direct-current motor, a rectifier, a controller and an alternating motor whereby the alternating-current motor is regulated by the current consumption of the direct-current motor.

HARRY C. REAGAN, JR.

Witnesses:
MAY REAGAN,
ORVILLE RAWSON.